Oct. 21, 1924.                                                1,512,091
                         W. H. HILL
              CONTROLLER FOR HEAT REGULATING APPLIANCES
                  Filed May 10, 1922        2 Sheet-Sheet 2

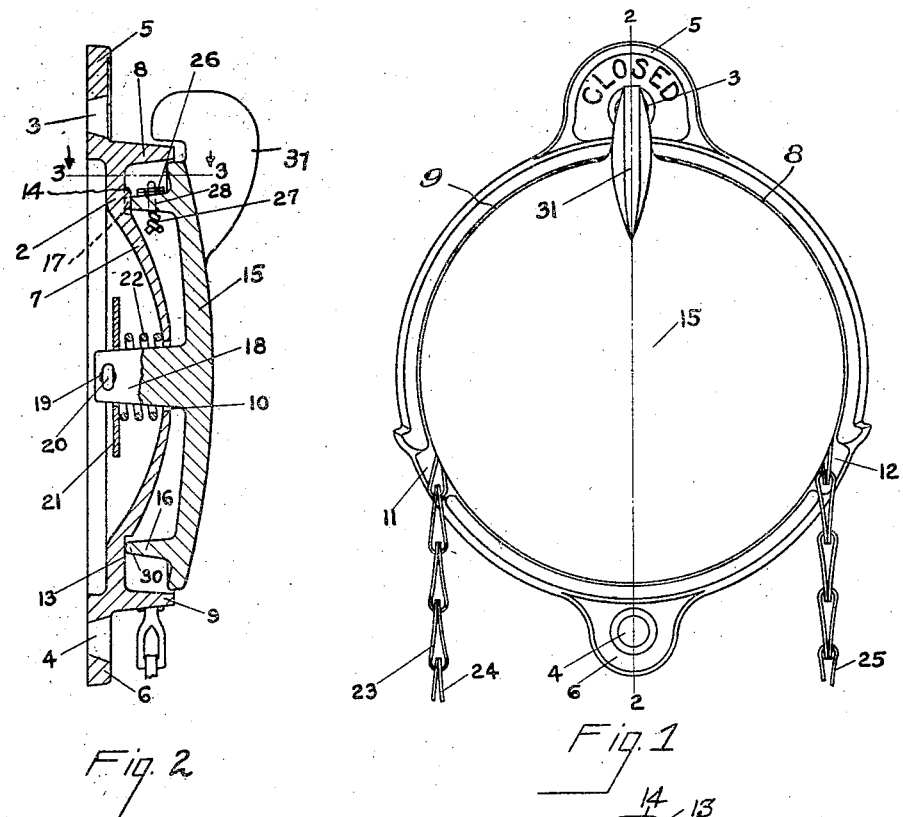

WILLIAM H. HILL   INVENTOR.

BY Richey, Slough & Fales

HIS ATTORNEYS

Patented Oct. 21, 1924.

1,512,091

UNITED STATES PATENT OFFICE.

WILLIAM H. HILL, OF ELYRIA, OHIO, ASSIGNOR TO FOX FURNACE COMPANY, OF ELYRIA, OHIO, A CORPORATION OF OHIO.

CONTROLLER FOR HEAT-REGULATING APPLIANCES.

Application filed May 10, 1922. Serial No. 559,772.

*To all whom it may concern:*

Be it known that I, WILLIAM H. HILL, a citizen of the United States, and residing at Elyria, in the county of Lorain and State of Ohio, have invented certain new and useful Improvements in Controllers for Heat-Regulating Appliances, of which the following is a full, clear, concise, and exact description, as will enable others skilled in the art to which my invention appertains to make and use the same.

My invention relates to controllers for heat regulating appliances, and more particularly to controllers of that type and kind commonly used in the residence and adapted to be operated to remotely control the dampers, check or draft valves or like appliance of a residence heating furnace, which is commonly located in the basement of the building wherein such controllers are generally located in one of the upper rooms thereto.

An object of my invention is to provide such a controller which may be mounted on a side wall or other like support in an upper room in a building, and which may be manually operated in a simple effective way, to control the more remote dampers and valves of a furnace located in the basement of the building, a controller being adapted to communicate motion to the said dampers and valves by moving a member to which is attached a chain extending to the said dampers and valves.

It is moreover another object of my invention to provide a controller in which the said manually operable remote controller of the said damper and valves may be had as aforesaid, and which in addition is adapted to be moved by a pull on the chain or other inter-connecting means for the said controller and the said damper and valves, as, for instance, when the furnace attendant is attending the furnace in the basement, the structure herein provided permits the manual operation of the dampers and valves by such attendant at the furnace in the basement, and the controller will be readily responsive to such operation, and will indicate the degree of operation.

Another object of my invention is to provide a structure wherein the controller will embody means whereby the damper and valves of a furnace may be held in any desired set position, except when as above related, the controller is to be displaced by a more powerful operation thereof which may be caused by the manual adjustment of the said damper and valves which will overpower any tendency of the said controller to maintain the valves and damper in a given set position.

Other objects of my invention and the invention itself will be more apparent by reference to the accompanying drawings, and the description relating thereto, which comprise this specification.

Referring to the drawings:—

Fig. 1 shows a front elevational view of an embodiment of my invention.

Fig. 2 shows a vertical section on the line 2—2 of Fig. 1.

Fig. 3 shows a section of a portion of the structure taken on the line 3—3 of Fig. 2 looking in the direction of the indicating arrows.

Figures 4, 5:
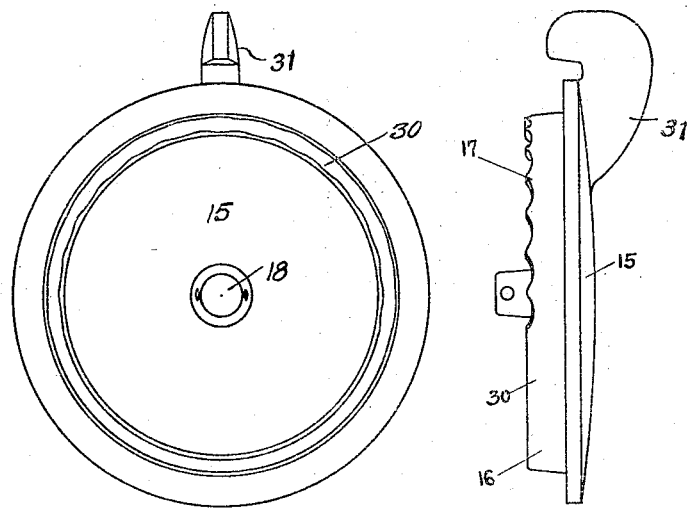
Fig. 4 shows a side elevational view of the rotary controlling cover employed in the embodiment of my invention illustrated.
Fig. 5 shows a rear elevational view of the cover shown in Fig. 4.
Figures 6, 7:
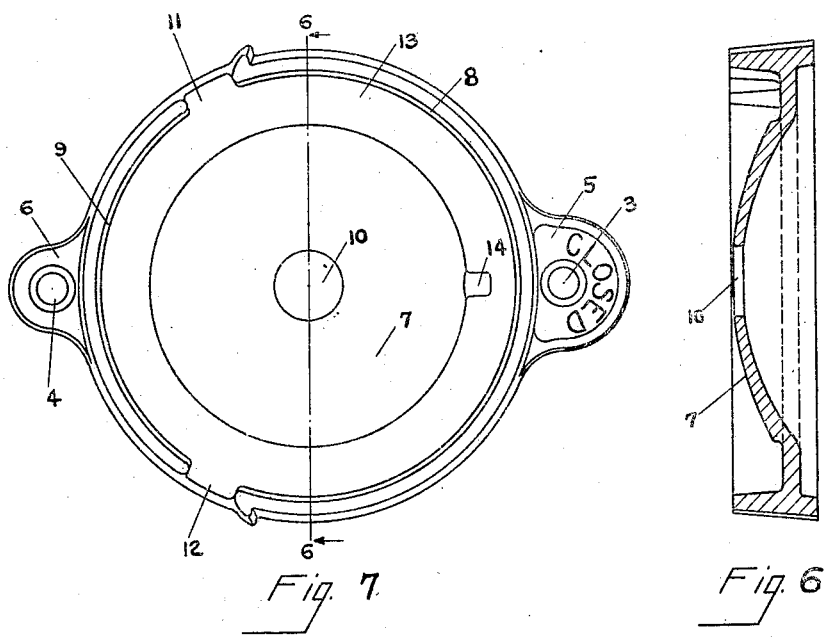
Fig. 6 shows a section of the base member taken on line 6—6 of Fig. 7.
Fig. 7 is an end elevation of the base member.

Referring now to the drawings in each figure of which like parts are indicated by like reference characters, at 2 I show a base member for the controller herein illustrated as an embodiment of my invention, the said base member being adapted to be secured by securing screws or bolts passing through openings 3 and 4 in flanges 5 and 6 of the said base member and into the wall of a room in which my improved controller is installed. The said base member comprises wall 7 and flanges 8 and 9, the said wall 7 being inwardly dished, that is, it is re-entrant and contains a centrally disposed opening 10.

The flanges have between their ends intervening openings 11 and 12 provided between the said side walls for a purpose later to be described. Flanges 5 and 6 are provided for the purpose of securing the base member 2 to the wall of a room by securing screws adapted to pass through the tapered openings 3 and 4 through the said flanges, the flange 5 being of suitable size so that it may contain an indicating inscription such as "Closed," as shown.

Intermediate the said arcuate flanges 8 and 9 and the inner re-entrant portion of the wall 7 is disposed what I will term a track base portion 13, such track base portion being annular and containing at one point, preferably adjacent the flange 5, a projection 14.

I provide also for my improved controller a rotary controlling cap or cover 15, said cover being generally of the form of a circular disc, but having an annular flange 16 provided near its periphery and projecting inwardly from the main body portion of the disc, a portion of the said flange being serrated at its edge as shown best at 17 in Fig. 4.

Also projecting inwardly from the body portion of the disc 15, and from the center thereof, I provide a stem 18, said inwardly projecting stem being perforated near its end as shown at 19. Preferably the circular disc portion of the said cover is of slightly less diameter than the diametric distance between the inner walls of the circular base flanges 8 and 9 so that the cover 15 may be positioned as shown in the figures on the base 2 with the circular disc cover fitting within the flanges 8 and 9 of the said base, and when so placed the stem 18 is adapted to project through the opening 10 of the base dished wall 7, said cover being secured in place on the base 2 by means of a cotter pin 20 and washer 21 together with a coiled spring 22, said washer 21 being placed adjacent the said pin, but between the said pin and the base end wall 7, the spring 22 in turn being interposed between the said washer 21 and the end wall 7 and encompassing the said stem 18, as shown.

In assembling the controller of my invention, I pass the chain 23, the ends 24 and 25 of which may lead to the controlling valves for a furnace such as the check valve and the damper valve of a furnace, over the flange 16 of the cover 15, and secure the chain 23 at 26 to the said flange 16, such as by a wire 27 passing through an opening 28 in the flange 16 for the purpose provided.

Then the cap or cover 15 is put into place on the base 2 and secured thereto, as described, by the cotter pin 20, the washer 21 and the spring 22, said spring adapted to continuously resiliently press the cap 15 by the inner extreme edge 30 against the so-called track portion 13 of the said base member, the arrangement being such that the serrations 17 of the said cover inwardly projecting flange 16 engage with the track projection 14.

When so assembled, a simultaneous pull on one of the chain ends 24 or 25 and a release of the chain in the other direction will take place when the cover plate is rotated, said cover plate 15 being capable of being rotated by an outwardly projecting integrally formed flange handle 31, or by pulling on the chains 24 or 25. When the cover 15 is so rotated, the spring 22 being compressed, will continuously press the edge of the flange 16 against the track 13 and the serrations 17 engage the projection 14, said projection 14 fitting between adjacent projections of the serrations will maintain, resiliently, and one might say frictionally, the said disc cover in any one of a large number of adjusted rotary operative positions, whereby the said valves, such as check and damper valves controlled by the chains 24 and 25 in any well-known manner, may be maintained until a sufficiently strong pull on one or the other chain ends, or a sufficiently strong effort being exerted on the handle 31, such a strong pull or effort will rotate the cover plate 15 against the tendency of the spring 22, and cooperating serrations 17 and projection 14 to maintain the said cover in a given adjusted position.

I find that the arrangement above set forth accomplishes the purposes desired in an uniformly efficient manner, and that a controller mechanism as herein set forth, when once put into use will remain in good operating condition for long periods of time.

Moreover, I find that the mechanism is very easily assembled so that the merest tyro in the art may quickly assemble or disassemble the mechanism and secure efficient results therefrom.

Having thus described my invention, I am aware that numerous and extensive departures may be made from the embodiment thereof herein illustrated and described, but without departing from the spirit of my invention.

I claim:—

1. In a controller of the class described, the combination of a base having spaced arcuate flanges projecting therefrom; a rotary disc member adapted to be positioned within the arcuate flanges of said base; a handle secured to said disc member for operating the same, an annular flange on one side of the said member, said flange having a serrated edge portion, a projection extending from the said base, said serrated edge portion adapted to move over the said projection when the said member is rotated, a stem for the said disc member projecting from the central portion of the annularly flanged side thereof, said base having a centrally disposed dished portion having its concave side remote from the said member, said stem adapted to project through an opening in the said centrally disposed base portion, and a spring disposed within the concavity of the said portion adapted to press the said member and the said base together, and a chain secured to and passing over the said annular flange outside surface, and extending between the arcuate flanges of said base to a heat regulating apparatus.

2. In a controller of the class described, the combination of a base having spaced arcuate flanges projecting therefrom, a rotary disc member adapted to be positioned within the arcuate flanges of said base, a handle secured to said disc member for operating the same, an annular flange on one side of the said member, said flange having a serrated edge portion, a projection extending from the said base, said serrated edge portion adapted to move over the said projection when the said member is rotated, a stem for the said disc member projecting from the central portion of the annularly flanged side thereof, said base having a centrally disposed dished portion having its concave side remote from the said member, said stem adapted to project through an opening in the said centrally disposed base portion, a spring disposed within the concavity of the said portion adapted to press the said member and the said base together, said spring being disposed in the form of a spiral encircling the said stem and between the concave face of the said base portion and the end of the said stem, and a chain secured to and passing over the said annular flange outside surface and extending between the arcuate flanges of said base to a heat regulating apparatus.

3. In a controller of the class described, the combination of an integrally cast base including spaced arcuate peripheral flanges projecting therefrom, a centrally apertured dished wall joining said flanges, and a projection extending outwardly from the base of said wall; an integrally cast rotatable disc member of a diameter to be positioned within the flanges of said base including a stem adapted to project through the aperture in the dished wall of the base, an annular flange, the end of which is formed with serrations for engaging the projection of said base, and an externally projecting handle; means to resiliently retain the stem projected through the opening in said base end; and a chain secured to the flange on said disc member and extending between the spaced arcuate flanges of the base to a heat regulating apparatus.

In witness whereof, I have hereunto signed my name this 8th day of May, 1922.

WILLIAM H. HILL.